US007620130B2

(12) United States Patent
Iwasaki et al.

(10) Patent No.: US 7,620,130 B2
(45) Date of Patent: Nov. 17, 2009

(54) WIRELESS DIVERSITY RECEIVER USING A COMBINER WITH CONTROL WEIGHTS THAT ARE BASED ON REPORTED TRANSMISSION POWER

(75) Inventors: Motoya Iwasaki, Tokyo (JP); Osami Nishimura, Tokyo (JP); Sei Hirade, Tokyo (JP); Yukio Haseba, Tokyo (JP)

(73) Assignee: NEC Corporation, Tokyo (JP)

( * ) Notice: Subject to any disclaimer, the term of this patent is extended or adjusted under 35 U.S.C. 154(b) by 702 days.

(21) Appl. No.: 11/071,236

(22) Filed: Mar. 4, 2005

(65) Prior Publication Data

US 2005/0201482 A1 Sep. 15, 2005

(30) Foreign Application Priority Data

Mar. 10, 2004 (JP) .............................. 2004-067901

(51) Int. Cl.
  *H04B 7/10* (2006.01)
(52) U.S. Cl. .................. 375/347; 455/127.1; 455/132
(58) Field of Classification Search ................ 375/347; 455/127.1, 132
  See application file for complete search history.

(56) References Cited

U.S. PATENT DOCUMENTS

| | | | | |
|---|---|---|---|---|
| 5,697,083 | A * | 12/1997 | Sano ........................ | 455/276.1 |
| 5,745,858 | A * | 4/1998 | Sato et al. ................ | 455/562.1 |
| 5,848,361 | A * | 12/1998 | Edwards .................. | 455/562.1 |
| 5,926,503 | A * | 7/1999 | Kelton et al. ............. | 375/148 |
| 5,982,327 | A * | 11/1999 | Vook et al. ............... | 342/380 |
| 5,999,826 | A * | 12/1999 | Whinnett .................. | 455/561 |
| 6,064,338 | A * | 5/2000 | Kobayakawa et al. ..... | 342/378 |
| 6,087,986 | A * | 7/2000 | Shoki et al. .............. | 342/383 |
| 6,185,258 | B1 * | 2/2001 | Alamouti et al. .......... | 375/260 |
| 6,229,840 | B1 * | 5/2001 | Ichihara .................... | 375/147 |
| 6,275,482 | B1 * | 8/2001 | Jevremovic et al. ....... | 370/334 |
| 6,336,033 | B1 * | 1/2002 | Yamaguchi et al. ....... | 455/273 |
| 6,430,724 | B1 * | 8/2002 | Laneman et al. .......... | 714/780 |
| 6,473,447 | B1 * | 10/2002 | Strich et al. ............... | 375/130 |
| 6,529,746 | B1 * | 3/2003 | Kotzin ...................... | 455/562.1 |
| 6,574,459 | B1 * | 6/2003 | Kaminski et al. .......... | 455/272 |

(Continued)

FOREIGN PATENT DOCUMENTS

CN 1211115 3/1999

(Continued)

OTHER PUBLICATIONS

Sandhu, Adaptive antenna system for PACS, MILCOM 97 Proceedings vol. 2, Nov. 2-5, 1997 pp. 792-797 vol. 2.*

(Continued)

*Primary Examiner*—Juan A Torres
(74) *Attorney, Agent, or Firm*—Sughrue Mion, PLLC

(57) ABSTRACT

A wireless communication apparatus with a plurality of antennas which receive a wireless reception signal from a secondary communication apparatus, and a combiner which combines signals from the plurality of antennas to form a combined signal or selects one of the signals from the plurality of antennas. A wireless communication apparatus with a plurality of antennas which transmits a wireless transmission signal to a secondary communication apparatus and a divider which divides a transmission signal into plurality of transmission signals to be transmitted by the plurality antennas or selects one of the plurality of antennas to transmit the transmission signal.

6 Claims, 10 Drawing Sheets

U.S. PATENT DOCUMENTS

| | | | |
|---|---|---|---|
| 6,603,746 B1 * | 8/2003 | Larijani et al. | 370/318 |
| 6,650,910 B1 * | 11/2003 | Mazur et al. | 455/562.1 |
| 6,671,496 B1 * | 12/2003 | Hoshi | 455/78 |
| 6,763,062 B1 * | 7/2004 | Kohno et al. | 375/220 |
| 6,834,043 B1 * | 12/2004 | Vook et al. | 370/310 |
| 6,873,834 B1 * | 3/2005 | Edwards et al. | 455/277.1 |
| 6,879,624 B2 * | 4/2005 | Sano | 375/147 |
| 6,999,794 B1 * | 2/2006 | Lindskog et al. | 455/562.1 |
| 7,072,611 B2 * | 7/2006 | Shapira | 455/7 |
| 7,263,146 B2 * | 8/2007 | van Rooyen | 375/347 |
| 7,266,355 B2 * | 9/2007 | Diloisy | 455/273 |
| 7,301,893 B2 * | 11/2007 | Onggosanusi et al. | 370/210 |
| 7,352,799 B2 * | 4/2008 | Pajukoski | 375/148 |
| 2002/0126745 A1 * | 9/2002 | Prysby et al. | 375/148 |
| 2002/0164964 A1 | 11/2002 | Stewart | |
| 2002/0181561 A1 * | 12/2002 | Sano | 375/148 |
| 2002/0193146 A1 * | 12/2002 | Wallace et al. | 455/562 |
| 2003/0040329 A1 * | 2/2003 | Yona et al. | 455/507 |
| 2003/0053525 A1 * | 3/2003 | Mehrabani et al. | 375/148 |
| 2003/0072396 A1 * | 4/2003 | Binshtok et al. | 375/346 |
| 2004/0033782 A1 * | 2/2004 | Horng et al. | 455/69 |
| 2004/0213196 A1 | 10/2004 | Deng et al. | |
| 2004/0234012 A1 * | 11/2004 | Rooyen | 375/347 |
| 2005/0085197 A1 * | 4/2005 | Laroia et al. | 455/101 |
| 2005/0184154 A1 * | 8/2005 | Tanaka et al. | 235/385 |
| 2006/0135097 A1 * | 6/2006 | Wang et al. | 455/132 |
| 2007/0042725 A1 * | 2/2007 | Poilasne et al. | 455/101 |

FOREIGN PATENT DOCUMENTS

| | | | |
|---|---|---|---|
| EP | 0 700 184 A2 | 3/1996 | |
| GB | 2 294 609 A | 5/1996 | |
| GB | 2 313 261 A | 11/1997 | |
| GB | 2313020 A | 11/1997 | |
| GB | 2 358 769 A | 8/2001 | |
| JP | 2002-26796 A | 1/2002 | |
| JP | 2003-18053 A | 1/2003 | |
| JP | 2003-32162 A | 1/2003 | |
| JP | 2003032162 A | * | 1/2003 |
| WO | 2005/039233 A1 | 4/2005 | |
| WO | 2005/081423 A2 | 9/2005 | |

OTHER PUBLICATIONS

Zhang, "Maximal-ratio combining over Nakagami fading channels with an arbitrary branch covariance matrix", IEEE Transactions on Vehicular Technology, vol. 48, Issue 4, Jul. 1999 pp. 1141-1150.*

Alamouti, S.M.: A Simple Tranmit Diversity Technique for Wireless Communications. In: IEEE Journal on Select Areas in Communications, vol. 16, No. 8, Oct. 1998, S. 1451-1458.

Jakes, W.C.: A Comparison of Specific Space Diversity Techniques for Reduction of Fast Fading in UHF Mobile Radio Systems. In: IEEE Transactions on Vehicular Technology, vol. VT-20, No. 4, Nov. 1971, S. 81-92.

Kaizhi Huang et al., "Smart Antenna and Spatial Diversity-Combining", IEEE, Apr. 20, 2002, pp. 340-344, IEEE Xplore.

Jiankang Wang et al., "Application of Diversity Technique in the Beyond 3G", Beyond 3G, Mar. 23, 2003, No. 3.

* cited by examiner

WIRELESS DIVERSITY RECEIVER USING A COMBINER WITH CONTROL WEIGHTS THAT ARE BASED ON REPORTED TRANSMISSION POWER

BACKGROUND OF THE INVENTION

Priority is claimed from Japanese Patent Application No. 067901/2004, filed Mar. 10, 2004, the content of which is incorporated herein by reference.

1. Field of Invention

The present invention relates to a mobile communication system, and in particular, to transmission and reception diversity technologies.

2. Description of the Related Art

FIG. 14 shows a wireless communication system in which a receiving apparatus 05 receives wireless signals from a transmitting apparatus 01 and/or 02 by means of an antenna 04. In the event of using only one antenna to receive signals, as shown in FIG. 14, there may be interference between signals, and thus the receiving power may be significantly reduced. Specifically, interference may occur between a direct wave a (or b) which is an electric wave transmitted from apparatus 01 (or 02) having directly reached the receiving antenna 04 and a reflected wave a' (or b') which is the electric wave from the transmitting apparatus 01 (or 02) having been reflected off an object 03 and having reached the receiving antenna 04. According to the system of FIG. 14, the use of only a single antenna may result in poor reception quality. Therefore, it is desirable for a receiving apparatus in a mobile communication system to have multiple antennas.

Japanese Laid-Open Patent No. 2003-32162 (JP '162) discloses a technique of antenna diversity reception, applicable to a UWB (Ultra-Wide Band) transmission system. According to JP '162, when a signal from a single transmission apparatus is being received at a reception apparatus, antenna diversity is obtained by determining which of a plurality of antennas receives the best reception and by selecting that antenna through which the signal from the transmission apparatus is received. According to this system, in order to obtain the best reception quality, a receiving apparatus can select the antenna which receives the best reception from a plurality of antennas. However, this system works well only if the receiving apparatus is receiving only a single signal at a time from a single transmission apparatus. If, on the other hand, a receiving apparatus is receiving a plurality of signals from a plurality of transmission apparatuses, the reception quality should be optimized with respect to all of the signals being received. However, such an optimization can not be obtained by merely selecting one of a plurality of antennas based on the reception quality of a single signal, because the plurality of signals from the plurality of transmission apparatuses are received via numerous signal paths and the best antenna may be different for each signal.

In addition to the above, and also in order to obtain a diversity gain (i.e. to obtain the best possible signal), JP '162 also describes a mobile communication base station which is equipped with two antennas and a separate reception circuit connected to each antenna. However, in order to reduce size and costs, it is desirable that a reception apparatus have only a single reception circuit even if the apparatus is equipped with multiple antennas.

BRIEF SUMMARY OF THE INVENTION

In order to solve the above-noted problems associated with conventional communication systems and to provide improved communication systems, the present invention provides a communication system in which a wireless communication apparatus, equipped with a plurality of antennas, may optimize or improve quality based on a plurality of reception signals as a whole. The present invention also provides a communication system in which a wireless communication apparatus, equipped with a plurality of antennas, may optimize or improve quality based on a transmission signal. In addition, the present invention provides a communication system in which a wireless communication apparatus, equipped with multiple antennas, may have a single reception circuit.

According to one aspect of the present invention, a wireless communication apparatus may comprise: a plurality of antenna means for receiving a wireless reception signal from a secondary communication apparatus; and a combining means for combining signals from the plurality of antennas to form a combined signal or for selecting one of the signals from the plurality of antennas.

According to another aspect of the invention, a wireless communication apparatus may comprise: a plurality of antenna means for transmitting a wireless transmission signal to a secondary communication apparatus; and a dividing means for dividing a transmission signal into plurality of transmission signals to be transmitted by the plurality of antennas means or for selecting one of the plurality of antenna means to transmit the transmission signal.

BRIEF DESCRIPTION OF THE DRAWINGS

The above and other objects, features and advantages of the invention will become more apparent by describing in detail exemplary embodiments thereof with reference to the attached drawings in which.

DETAILED DESCRIPTION OF THE INVENTION

Exemplary embodiments of the invention will now be described below by reference to the attached Figures. The described exemplary embodiments are intended to assist the understanding of the invention, and are not intended to limit the scope of the invention in any way.

Figure 1:
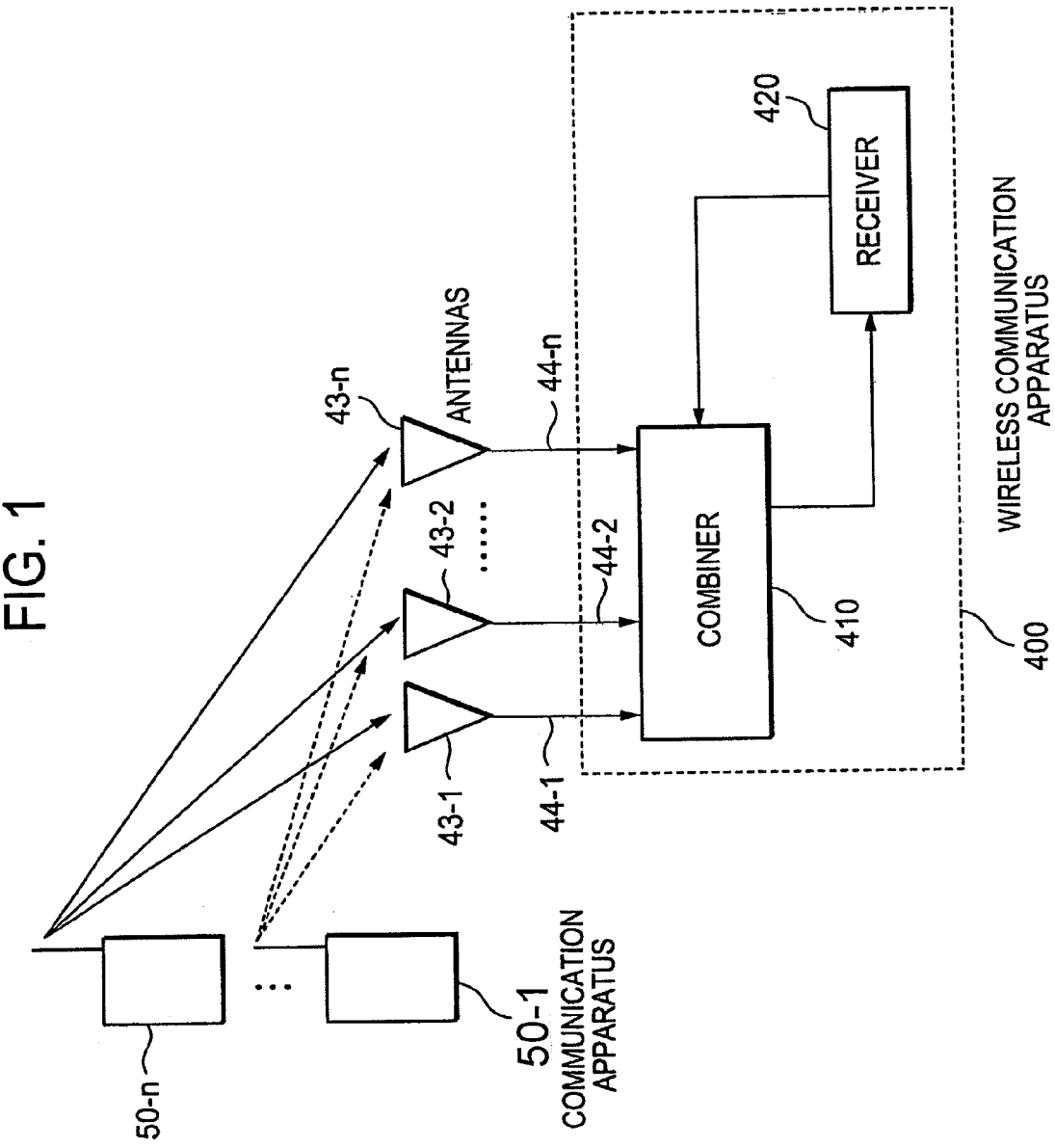
FIG. 1 illustrates a communication system according to a first embodiment of the present invention.

FIG. 1 shows a communication system of a first embodiment of the present invention. The communication system of the first embodiment comprises wireless communication apparatus 400 and a plurality of communication apparatuses 50-1 to 50-n.

The communication apparatuses 50-1 to 50-n transmit reception signals to the wireless communication apparatus. Any type of modulations, for example, but not limited to ASK (Amplitude Shift Keying), FSK (Frequency Shift Keying), PSK (Phase Shift Keying), or QAM (Quadrature Amplitude), etc., and/or any type of multiplex system, for example, but not limited to TDM (Time Division Multiplexing), FDM (Frequency Division Multiplexing), or CDMA (Code Division Multiple Access), etc., can be applied to the reception signals and/or transmission signals according to any of the embodiments described herein.

The wireless communication apparatus 400 comprises a combiner 410, a receiver 420, and multiple antennas 43-1 to 43-n, where n is two or more. The antennas 43-1 to 43-n receive the reception signals transmitted from the communication apparatuses 50-1 to 50-n. Specifically, each reception signal transmitted from each communication apparatus is received by all of the antennas according to this embodiment and all the additional embodiments described herein. In addition, the antennas 43-1 to 43-n send respective reception signals 44-1 to 44-n, which are generated from the reception signals, to the combiner 410. The combiner 410 receives the reception signals 44-1 to 44-n from the antennas 43-1 to 43-n and combines the reception signals into a combined signal. Furthermore, the combiner 410 transmits the combined signal to the receiver 420. The receiver 420 receives the combined signal from the combiner 410.

The combiner 410 may weight the reception signals 44-1 to 44-n and add them to form the combined signal. The weights may be fixed or variable and may be set by setting the gain of amplifiers assigned to the respective antennas or by another means as would be understood by one of skill in the art, in this embodiment and also in the following other embodiments.

The receiver 420 may transmit information about the reception signals to the combiner 410. For example, the receiver may transmit information related to a transmission power of the reception signals from the communication apparatuses 50-1 to 50-n. Further, the transmission power of the reception signals transmitted from the plurality of communication apparatuses may be controlled by a closed loop power control between the wireless communication apparatus 400 and the communication apparatuses 50-1 to 50-n.

Accordingly, the combiner 410 may control the variable weights, assigned to signals 44-1 to 44-n, based on the transmission powers of the reception signals transmitted from communication apparatuses 50-1 to 50-n. For example, the combiner 410 may control the variable weights with the aim of reducing one of: a maximum transmission power of the reception signals; an average transmission power of the reception signals; a fluctuation of the average transmission power of the reception signals; a difference between the maximum transmission power and the minimum transmission power of the reception signals; and the number of reception signals for which transmission power is higher than a predetermined transmission power.

The combiner 410 may control the variable weights at regular intervals or at certain times defined by one of: when a maximum transmission power of the reception signals is higher than a predetermined transmission power; when an average value of the transmission powers of the reception signals is higher than a predetermined average value; when the number of reception signals for which transmission power is higher than a predetermined transmission power, is higher than a predetermined number; and when a fluctuation of the average transmission power of the reception signals is higher than a predetermined fluctuation value. The variable weight control may be accomplished by means of a trial and error process or another process as would be understood by one of skill in the art, in this embodiment and also in the following additional embodiments.

Figure 2:
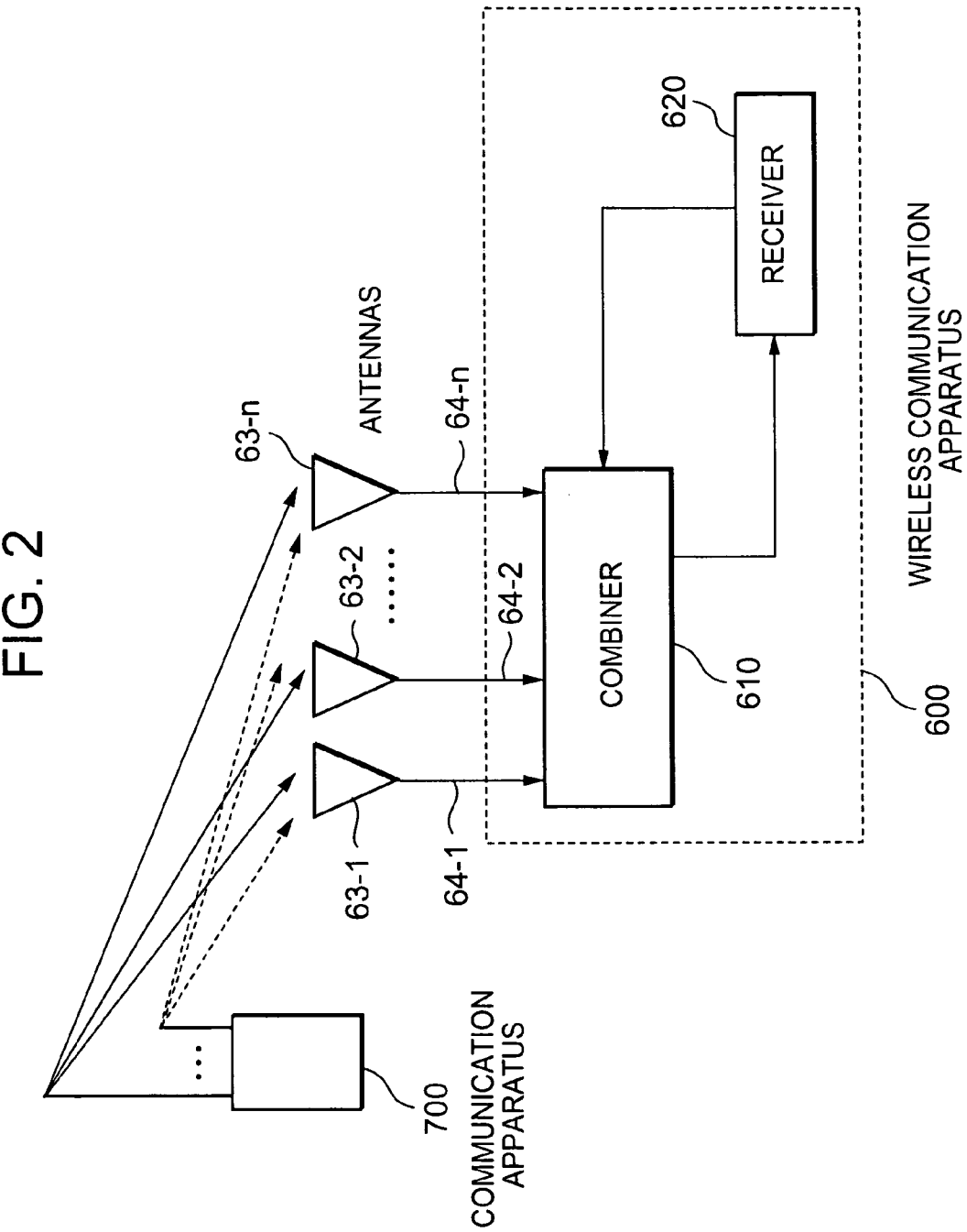
FIG. 2 illustrates a communication system according to a second embodiment of the present invention.

FIG. 2 shows a communication system of a second embodiment of the present invention. The communication system of the second embodiment comprises a wireless communication apparatus 600 and a communication apparatus 700.

The communication apparatus 700 transmits plurality of reception signals respectively from a plurality of antennas. Each reception signal may convey different data than that conveyed by other signals, or each of the plurality of reception signals may convey the same data.

The wireless communication apparatus 600 comprises a combiner 610, a receiver 620, and plurality of antennas 63-1 to 63-n. where n is two or more. The antennas 63-1 to 63-n receive the reception signals transmitted from the communication apparatus 700. In addition, the antennas 62-1 to 63-n send respective reception signals 64-1 to 64-n, which are generated from the plurality of reception signals, to the combiner 610. The combiner 610 receives the signals 64-1 to 64-n from the antennas 63-1 to 63-n, respectively, and combines the reception signals into a combined signal. Furthermore, the combiner 610 transmits the combined signal to the receiver 620. The receiver 620 receives the combined signal from the combiner 610.

The combiner 610 may weight the signals 64-1 to 64-n and add them to form the combined signal. The weights may be fixed or variable, as described with respect to the first embodiment.

Further, as described with respect to the first embodiment, the receiver 620 may transmit information about the reception signals to the combiner 610, and the transmission powers of the reception signals transmitted from the communication apparatus 700 may be controlled by a closed loop power control between the wireless communication apparatus 600 and the communication apparatus 700.

Accordingly, as described with respect to the first embodiment, the combiner 610 may control the variable weights assigned to reception signals 64-1 to 64-n, based on the transmission powers of the reception signals transmitted from the communication apparatus 700.

Also as described with respect to the first embodiment, the combiner 610 may control the variable weights at regular intervals or at certain specific times.

Figure 3:
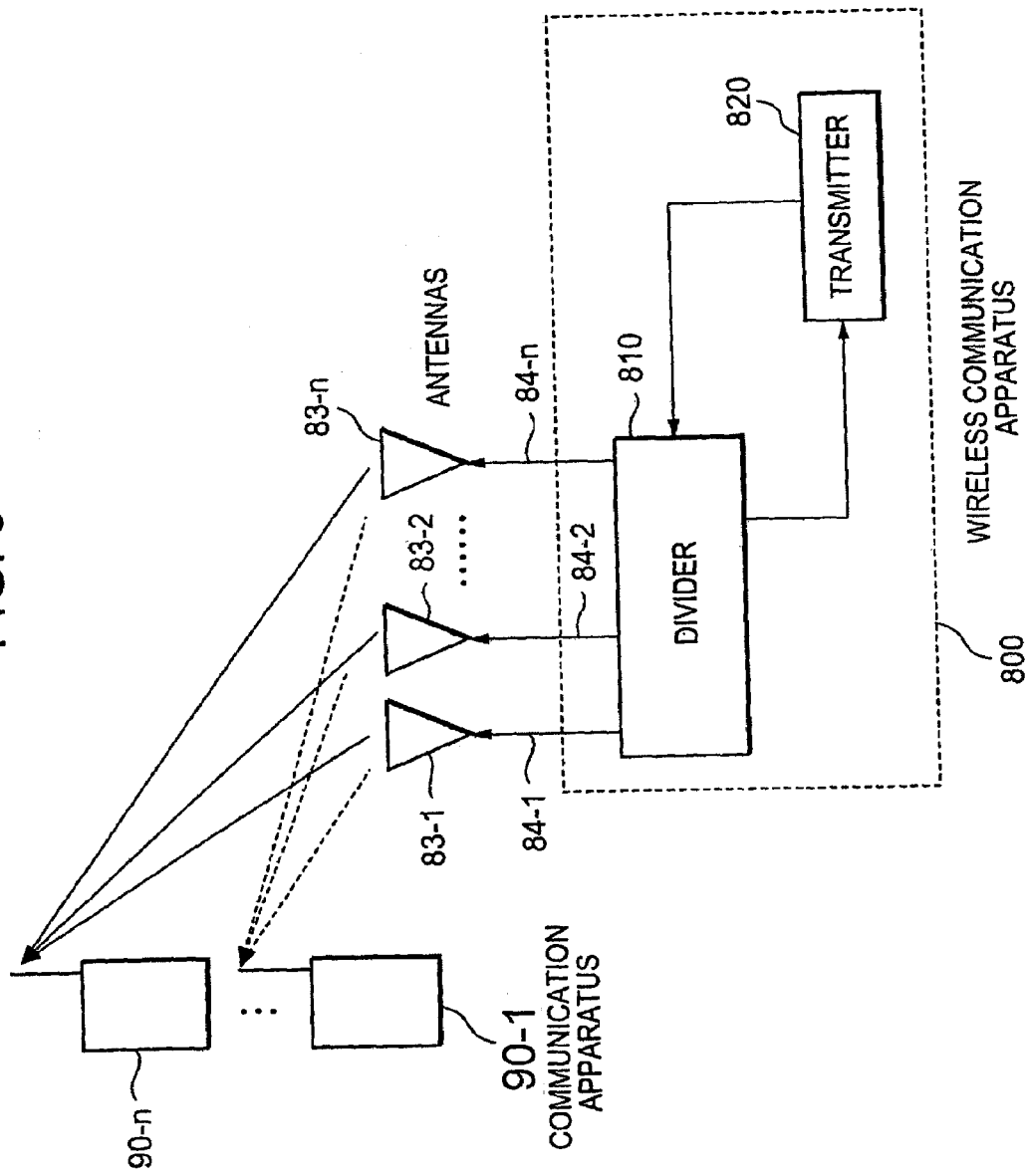
FIG. 3 illustrates a communication system according to a third embodiment of the present invention.

FIG. 3 shows a communication system of a third embodiment of the present invention. The communication system in the third embodiment comprises a wireless communication apparatus 800, and a plurality of communication apparatuses 90-1 to 90-n, where n is two or more.

The wireless communication apparatus 800 comprises a divider 810, a transmitter 820 and a plurality of antennas 83-1 to 83-n. The transmitter 820 transmits a plurality of transmission signals to the divider 810. Each of the transmission signals may be designated for transmission to each of the communication apparatuses 90-1 to 90-n, respectively. The divider 810 receives the transmission signals from the transmitter 820, and the divider 810 divides the transmission signals into transmission signals 84-1 to 84-n, and transmits the transmission signals to the antennas 83-1 to 83-n, respectively. The antennas 83-1 to 83-n receive the transmission signals 84-1 to 84-n, respectively, from the divider 810, and each antenna transmits a transmission signal, generated from the transmission signals 84-1 to 84-n, to the communication apparatuses 90-1 to 90-n.

The communication apparatuses 90-1 to 90-n receive the transmission signals transmitted from the wireless communication apparatus 800.

The transmitter 820 may send information about the transmission signals to the divider 810. For example, the transmitter 820 may send information relating to transmission powers of the transmission signals. Further, the transmission powers of the transmission signals may be controlled by a closed loop power control between the wireless communication apparatus 800 and the communication apparatuses 90-1 to 90-n.

The divider 810 divides the transmission signals received from the transmitter 820 into transmission signals 84-1 to 84-n in a variable ratio. The variable ratio may be set by setting the gain of amplifiers assigned to the respective antennas or by another means as would be understood by one of skill in the art, in this embodiment and also in the following embodiments. In addition, the variable ratio may be controlled based on the information relating to the transmission powers of the transmission signals received from the transmitter 820. For example, the divider 810 may control the variable ratio with the aim of reducing one of: a maximum transmission power of the transmission signals; an average transmission power o of the transmission signals; a fluctuation of the average transmission power of the transmission signals; a difference between the maximum transmission power and the minimum transmission power a of the transmission signals; and the number of transmission signals for which transmission power is than a predetermined transmission power. The variable ratio control may be accomplished by means of a trial and error process or by another process as would be understood by one of skill in the art in this embodiment and also in the following embodiments.

The divider may control the variable ratio at regular intervals or may control the variable ratio a certain times defined by one of: a maximum transmission power of the transmission signals is higher than a predetermined transmission power; when an average transmission power value of the transmission signals is higher than a predetermined average value; the number of transmission signals for which transmission power is higher than a predetermined transmission power, is higher than a predetermined number; and when fluctuation of the average transmission power of the transmission signals is higher than a predetermined fluctuation value.

Figure 4:
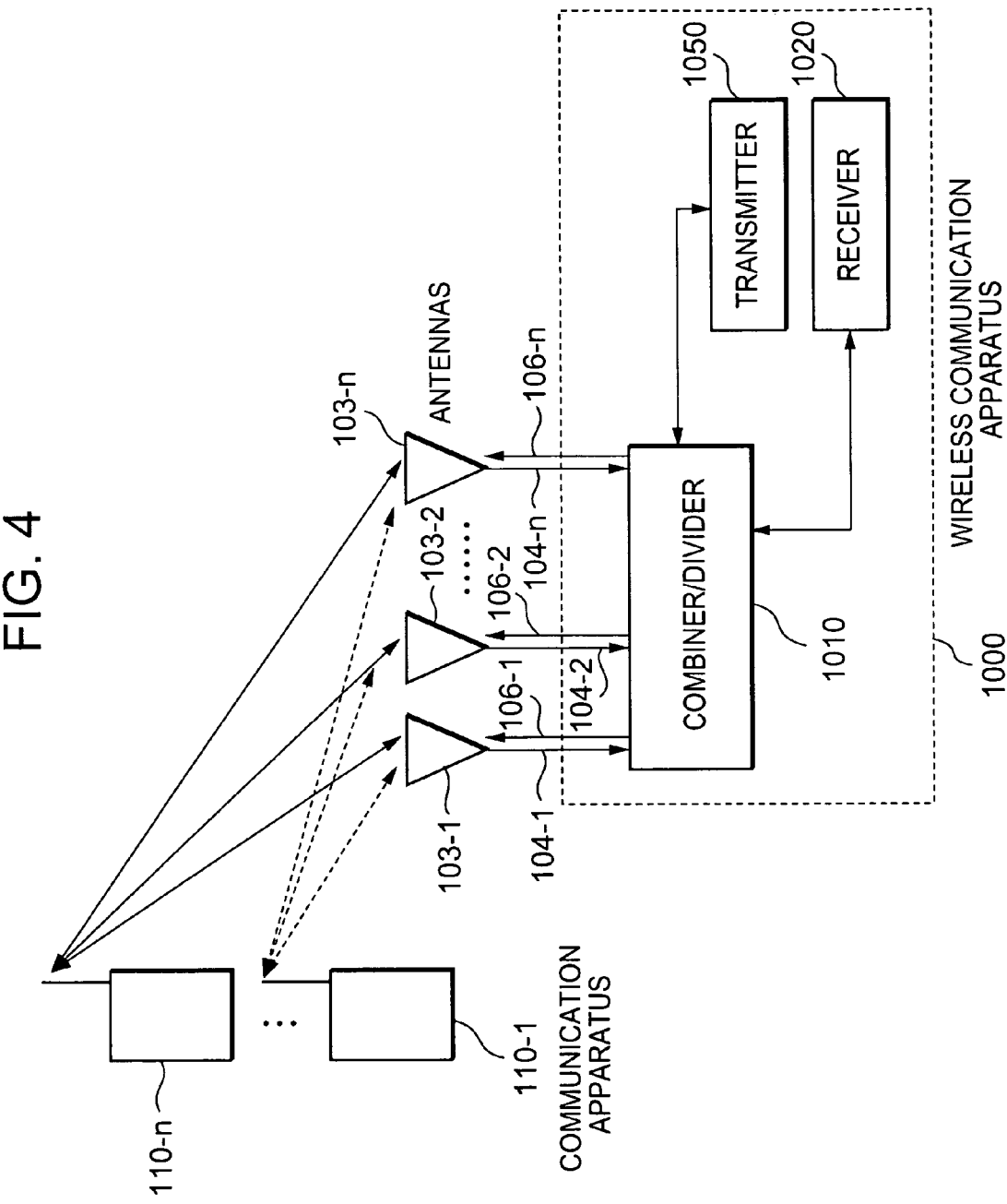
FIG. 4 illustrates a communication system according to a fourth embodiment of the present invention.

FIG. 4 shows a communication system according to a fourth embodiment of the present invention. The communication system of the fourth embodiment comprises wireless communication apparatus 1000 and a plurality of communication apparatuses 110-1 to 110-n, where n is two or more.

The communication apparatuses 110-1 to 110-n transmit reception signals to the wireless communication apparatus 1000.

The wireless communication apparatus 1000 comprises a combiner/divider 1010, a receiver 1020, a transmitter 1050, and multiple antennas 103-1 to 103-n, where n is two or more. The antennas 103-1 to 103-n receive the reception signals transmitted from the communication apparatuses 110-1 to 110-n and transmit reception signals 104-1 to 104-n, which are generated from the reception signals, respectively, to the combiner/divider 1010. The antennas 103-1 to 103-n also receive transmission signals 106-1 to 106-n from the combiner/divider and transmit them to the communication apparatuses 110-1 to 110-n. The combiner/divider 1010 receives the reception signals 104-1 to 104-n from the antennas 103-1 to 103-n and combines them into a combined signal which is transmitted to the receiver 1020. Furthermore, the combiner/divider receives the transmission signals from the transmitter 1050, and divides them into transmission signals 106-1 to 106-n. Then, the combiner/divider outputs the transmission signals 106-1 to 106-n to the antennas 103-1 to 103-n. The receiver 1020 receives the combined signal from the combiner 1010. The transmitter outputs the transmission signals to the combiner/divider 1010.

The combiner/divider 1010 may weight the reception signals 104-1 to 104-n and add the weighted signals to produce the combined signal.

The reception signals 104-1 to 104-n may be weighted in variable weights by the combiner/divider, and the transmission signals from the transmitter may be divided into transmission signals 106-1 to 106-n based on the variable weights associated with the respective reception signals 104-1 to 104-n.

The transmitter 1050 may transmit information to the combiner/divider 1010 about the transmission signals transmitted to the communication apparatuses 110-1 to 110-n from the transmitter 1050. For example, the transmitter 1050 may transmit information to the combiner/divider 1010 related to a transmission power of the transmission signals communication apparatuses 106-1 to 106-n. Further, the transmission powers of the transmission signals communication apparatuses may be controlled by a closed loop power control between the wireless communication apparatus 1000 and the communication apparatuses 110-1 to 110-n.

Also, as described with respect to the first embodiment, the receiver may transmit information relating to the transmission power of the reception signals 104-1 to 104-n to the combiner/divider 1010.

The combiner/divider 1010 may then control the variable weights assigned to reception signals based on the received information related to the transmission powers of the transmission signals 106-1 to 106-n or of the reception signals 104-1 to 104-n. For example, the combiner/divider 1010 may control the variable weights with the aim of reducing one of: a maximum transmission power of the transmission (or reception) signals; an average transmission power of the of the transmission (or reception) signals, a fluctuation of the average transmission power of the transmission (or reception) signals; a difference between the maximum transmission power and the minimum transmission power of the transmission (or reception) signals; and the number of transmission (or reception) signals for which transmission power is higher than a predetermined transmission power.

The combiner/divider 1010 may control the variable weights at regular intervals or may control the variable weights at certain times defined by one of: when a maximum transmission power of the transmission (or reception) signals is higher than a predetermined transmission power; when an average transmission powers of the transmission (or reception) signals is higher than a predetermined average value; when the number of transmission (or reception) signals for which transmission power is higher than a predetermined transmission power, is higher than a predetermined number; and when a fluctuation of the average transmission power of the transmission (ore reception) signals is higher than a predetermined fluctuation value.

According to an alternative aspect of the fourth embodiment, the combiner/divider 1010 may divide the transmission signals into the transmission signals 106-1 to 106-n in a variable ratio and may weight the reception signals 104-1 to 104-n based on the variable ratio associated with the transmission signals 106-1 to 106-n. The combiner/divider 1010 may control the variable ratio based on the received information relating to the transmission powers of the transmission signals 106-1 to 106-n or of the reception signals 104-1 to 104-n. For example, the combiner/divider 1010 may control the variable ratio with the aim of reducing one of: a maximum transmission power of the transmission (or reception signals); an average transmission power of the transmission (or reception) signals; a fluctuation of the average transmission power of the transmission (or reception) signals; a difference between the maximum transmission power and the minimum transmission power of the transmission (or reception) signals; and the number of transmission (or reception) signals for which transmission power is higher than a predetermined transmission power.

The combiner/divider 1010 may control the variable ratio at regular intervals or at certain times defined by one of: when a maximum transmission power of the reception signals is higher than a predetermined transmission power; when an average transmission power of the reception signals is higher than a predetermined average value, when the number of the reception signal, for which transmission power is higher than a predetermined transmission power, is higher than a predetermined number; and when a fluctuation of the average transmission power is higher than a predetermined fluctuation value.

Figure 5:
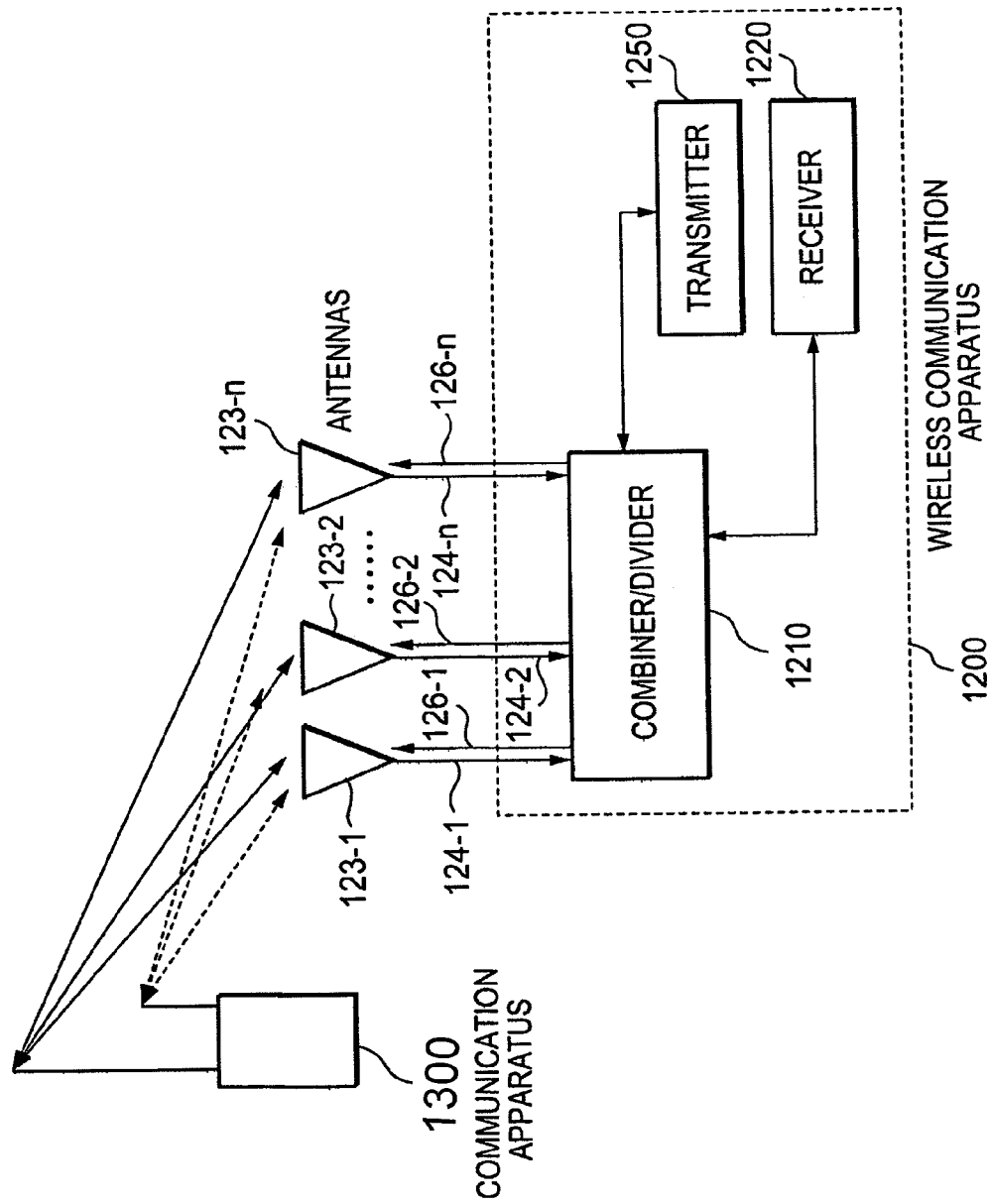
FIG. 5 illustrates a communication system according to a fifth embodiment of the present invention.

FIG. 5 shows a communication system according to a fifth embodiment of the present invention. The communication system of the fifth embodiment comprises a wireless communication apparatus 1200 and a communication apparatus 1300.

The communication apparatus 1300 is similar in function and design to the communication apparatus 700 of the second embodiment and therefore will not be described again in detail.

The wireless communication apparatus 1200 comprises a combiner/divider 1210, a receiver 1220, a transmitter 1250, and plurality of antennas 123-1 to 123-n. where n is two or more. The antennas 123-1 to 123-n receive the reception signals transmitted from the communication apparatus 1300. In addition, the antennas 123-1 to 123-n send to the combined signals 124-1 to 124-n, respectively, which are generated from the reception signals. Further, the antennas 123-1 to 123-n receive transmission signals 126-1 to 126-n from the combiner/divider 1210, and transmit them to the communication apparatus 1300. The combiner/divider 1210 receives the reception signals-124-1 to 124-n from the antennas 123-1 to 123-n and combines them to produce a combined signal, which is transmitted to the receiver 1220. Furthermore, the combiner/divider 1210 receives transmission signals from the transmitter 1250, and divides them into transmission signals 126-1 to 126-n and outputs them to the antennas 123-1 to 123-n. The receiver 1220 receives the combined signal from the combiner 1210. The transmitter 1250 outputs the transmission signals to the combiner/divider 1210.

As described in detail with respect to the fourth embodiment, the combiner/divider 1210 may weight the reception signals 124-1 to 124-n and add them to produce the combined signal.

Further, as described in detail with respect to the fourth embodiment, the reception signals 124-1 to 124-n may be weighted in variable weights, and the transmission signals from the transmitter 1250 may be divided into transmission signals 126-1 to 126-n in a ratio based on those variable weights.

As described in detail with respect to the fourth embodiment, the transmitter 1250 may transmit information to the combiner/divider 1210 about the transmission signals. The transmission powers of the transmission signals 126-1 to 126-n may be controlled by a closed loop power control between the wireless communication apparatus 1200 and the communication apparatuses 1300.

Accordingly, as described in detail with respect to the fourth embodiment, the combiner/divider 1210 may control the variable weights assigned to the reception signals 124-1 to 124-n and to the transmission signals 126-1 to 126-n, based on the transmission powers of the transmission signals.

Also as described in detail with respect to the fourth embodiment, the combiner/divider 1210 may control the variable weights at regular intervals or at certain specific times.

In the third and fourth embodiments, the wireless communication apparatus may transmit a plurality of transmission signals to the plurality of communication apparatuses. However, the communication apparatus also may transmit the transmission signals to a single one of the plurality of communication apparatuses.

In the first, second, forth, and fifth embodiments, the combiner or combiner/divider also may select a single one of the plurality of signals to be sent to the receiver instead of combining the plurality of signals from the antennas. In that event, the combiner or combiner/divider selects one of the reception signals from the antennas based on the transmission power of the plurality of reception signals transmitted from the communication apparatuses, or based on the transmission power of the transmission signals transmitted to the plurality of communication apparatuses. One of reception signals from the antennas may be selected by means of a trial and error process or by another means as would be understood by one of skill in the art.

For example, the combiner or combiner/divider may select one of the reception signals from the antennas with the aim of reducing one of: a maximum transmission power of the reception signals from the communication apparatus; an average transmission power of the reception signals; a fluctuation of the average transmission power of the reception signals; a difference between the maximum transmission power and the minimum transmission power of the reception signals; and the number of reception signals for which transmission power is higher than a predetermined transmission power.

Furthermore, the combiner or combiner/divider may select one of the reception signals from the antennas with the aim of reducing one of: a maximum transmission power of the transmission signals; an average transmission power of the transmission signals; a fluctuation of the average transmission power of the transmission signals; a difference between the maximum transmission power and the minimum transmission power of the transmission signals; and the number of transmission signals for which transmission power is higher than a predetermined transmission power.

The combiner or combiner/divider also may selects one of the reception signals from the antennas at regular intervals. In addition, the combiner or combiner/divider also may selects one of the reception signals from the antennas at a certain time defined by one of: when a maximum transmission power of the reception signals is higher than a predetermined transmission power; when an average transmission power of the reception signal is higher than a predetermined average value; when the number of reception signals for which transmission power is higher than a predetermined transmission power is higher than a predetermined number; and when a fluctuation of the average transmission power of the reception signals is higher than a predetermined fluctuation value.

Furthermore, the combiner or combiner/divider also may select one of the reception signals from the antennas when a maximum transmission power of the transmission signals t is higher than a predetermined transmission power; when an average transmission power of the transmission signals is higher than a predetermined average value; when the number of transmission signals for which transmission power is higher than a predetermined transmission power is higher than a predetermined number; or when a fluctuation of the average transmission power of the transmission signals is higher than a predetermined fluctuation value.

In the third, to fifth embodiments, the combiner or combiner/divider also may select one of the antennas to transmit the transmission signals. In that event, the combiner or combiner/divider selects one of the antennas based on the transmission powers of the transmission signals transmitted, or based on the transmission powers of the reception signals from the communication apparatus. In addition, the combiner or combiner/divider sends the transmission signals to the selected antenna.

Further, the transmitter may transmit a single transmission signal to the combiner or the combiner/divider instead of transmitting a plurality of transmission signals. In addition, the antennas may receive a single reception signal from the communication apparatus. In that event, the combiner or combiner/divider selects one of the antennas based on the transmission power of the transmission signal, or based on the transmission power of the reception signal from the communication apparatus. In addition, the combiner or combiner/divider sends the transmission signal to the selected antenna. One of the antennas may be selected by means of a trial and error process or by another means as would be understood by one of skill in the art.

Still further, the combiner or combiner/divider may select one of the antennas with the aim of reducing one of: a maximum transmission power of the transmission signals; an average transmission power of the transmission signals; a fluctuation of the average transmission power of the transmission signals; a difference between the maximum transmission power and the minimum transmission power of the transmission signals; and the number of transmission signals for which transmission power is higher than a predetermined transmission power.

Furthermore, the combiner or combiner/divider may select one of the antennas with the aim of reducing one of: a maximum transmission power of the reception signals; an average transmission power of the reception signals; a fluctuation of the average transmission power of the reception signals; a difference between the maximum transmission power and the minimum transmission power a of the reception signals; and the number of the reception signals for which transmission power is higher than a predetermined transmission power.

The combiner or combiner/divider also may select one of the antennas at regular intervals or may select one of the antennas at certain times defined by one of: when a maximum transmission power of the transmission signals is higher than a predetermined transmission power; when an average transmission power of the transmission signals is higher than a predetermined average value; when the number of transmission signals for which transmission power is higher than a predetermined transmission power is higher than a predetermined number; and when a fluctuation of the average transmission power of the transmission signals is higher than a predetermined fluctuation value.

Furthermore, the combiner or combiner/divider also may select one of the antennas based on when a maximum transmission power of the plural reception signals is higher than a predetermined transmission power; when an average transmission power of the reception signals is higher than a predetermined average value; when the number of reception signals for which transmission power is higher than a predetermined transmission power is higher than a predetermined number; or when a fluctuation of the average transmission power of the reception signals is higher than a predetermined fluctuation value.

In the embodiments described above, an antenna for transmission and an antenna for reception, or the ratio for transmission and the weights for the reception may be selected or controlled separately by means of the above methods. In this case, the wireless base station has both the configuration of FIG. 1 or FIG. 2 and the configuration of FIG. 3.

A wireless communication apparatus according to the first to third embodiments may be any of a number of wireless apparatuses equipped with multiple antennas, such as a mobile terminal, a base station, and so on, as would be understood by one of skill in the art.

Figure 6:
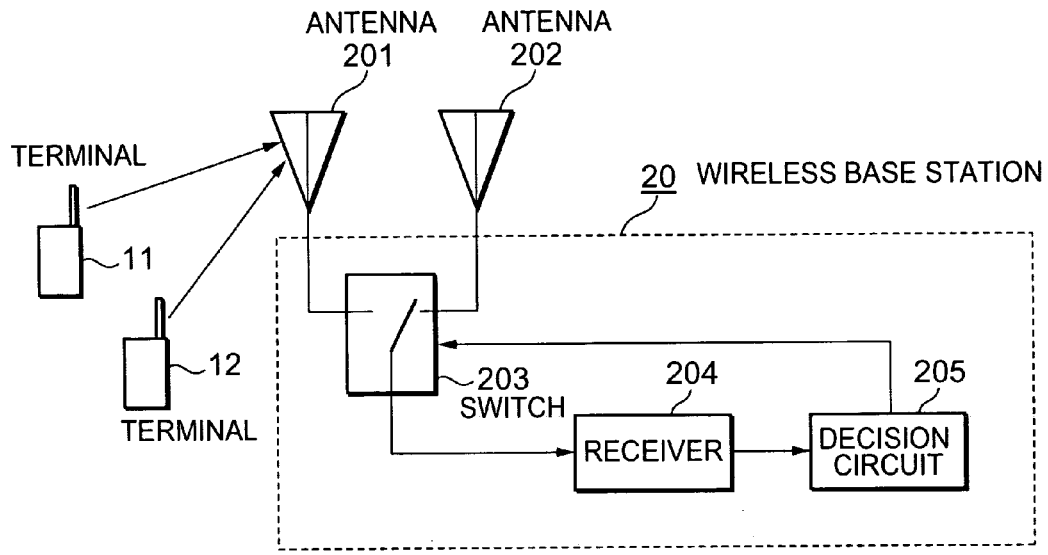
FIG. 6 illustrates a communication system according to a sixth embodiment of the present invention.

FIG. 6 shows a communication system according to a sixth embodiment of the present invention. The communication system according to the sixth embodiment comprises a wireless base station 20 and terminals 11 and 12. The wireless base station 20 is an example of the wireless communication apparatus of the first, second, fourth, and fifth embodiments.

A receiving apparatus of the wireless base station 20 comprises a first antenna 201, a second antenna 202, a switch 203, a receiver 204, and a decision circuit 205. The first and second antennas 201 and 202 receive wireless signals from the terminals 11 and/or 12. Then antennas 201 and 202 output the reception signals generated from the wireless signals to the switch 203. The switch 203 receives the reception signals from the antennas 201 and 202 and receives a switch control signal from the decision circuit 205. Then, the switch 203 switches a coupling between the first antenna 201 and the second antenna 202 and the receiver 204 based on the switch control signal. The receiver 204 receives, amplifies, and demodulates the signal from the selected antenna. The decision circuit 205 receives information from the receiver 204 (e.g. transmission power values) and outputs the switch control signal to the switch 203.

The antennas 201 and 202, the switch 203, and the receiver 204 are examples of the plural antennas, the combiner, and receiver, respectively, in the first, second, fourth, and fifth embodiments. The decision circuit 205 is an example of a circuit embedded in the combiner in the first and second embodiments.

When switching and selecting the antenna, at least one of methods (a) and (b) may be used.

(a) A plurality of transmission power report values from the user terminals is used as the basis for selecting the antenna for reception.

(b) A plurality of transmission power values from the wireless base station to the user terminals is used as the basis for selecting the antenna for transmission.

In this embodiment, assuming that both the wireless base station 20 and terminals 11 and 12 control transmission power by means of a closed-loop, the transmission power report values of the user terminals 11 and 12 are used as the basis for selecting the antennas 201 and 202 for reception.

Comparing transmission power report values from the of user terminals 11 and 12 before and after switching the antennas 201 and 202, the switch 203 selects one of the antennas 201 and 202 to be coupled to the receiver 204 following at least one of the rules (A1) to (A4) described below.

(A1) The switch 203 selects an antenna to be coupled to the receiver 204 with the aim of minimizing a maximum value of the transmission power report values reported from the user terminals 11 and 12.

(A2) The switch 203 selects an antenna to be coupled to the receiver 204 with the aim of minimizing a difference between a maximum transmission power report value and a minimum transmission power report values from user terminals 11 and 12.

(A3) The switch 203 selects an antenna to be coupled to the receiver 204 with the aim of minimizing an average of the transmission power report values reported from the plurality of user terminals 11, and 12.

(A4) The switch 203 selects an antenna to be coupled to the receiver 204 with the aim of minimizing the number of user terminals for which transmission power report values exceed a predetermined threshold.

To compare the transmission power report values reported from the user terminals before and after switching the antennas 201 and 202, an operation for switching the coupling is required. According to this embodiment, a timing on which the switch 203 switches the coupling is determined by following the rules of (B1) or (B2) described bellow.

(B1) The switch 203 switches the coupling at predetermined intervals.

(B2) The switch 203 switches the coupling when one of events (C1) to (C4) described bellow occurs.

(C1) At least one of the transmission power report values exceeds a predetermined threshold.

(C2) A difference between the maximum value and minimum value of the transmission power report values exceeds a predetermined threshold.

(C3) An average of the transmission power report values exceeds a predetermined threshold.

(C4) A ratio of the number of user terminals, for which the transmission power report values exceeds a predetermined number, to the total number of the user terminals is more than a predetermined value.

Figure 7:
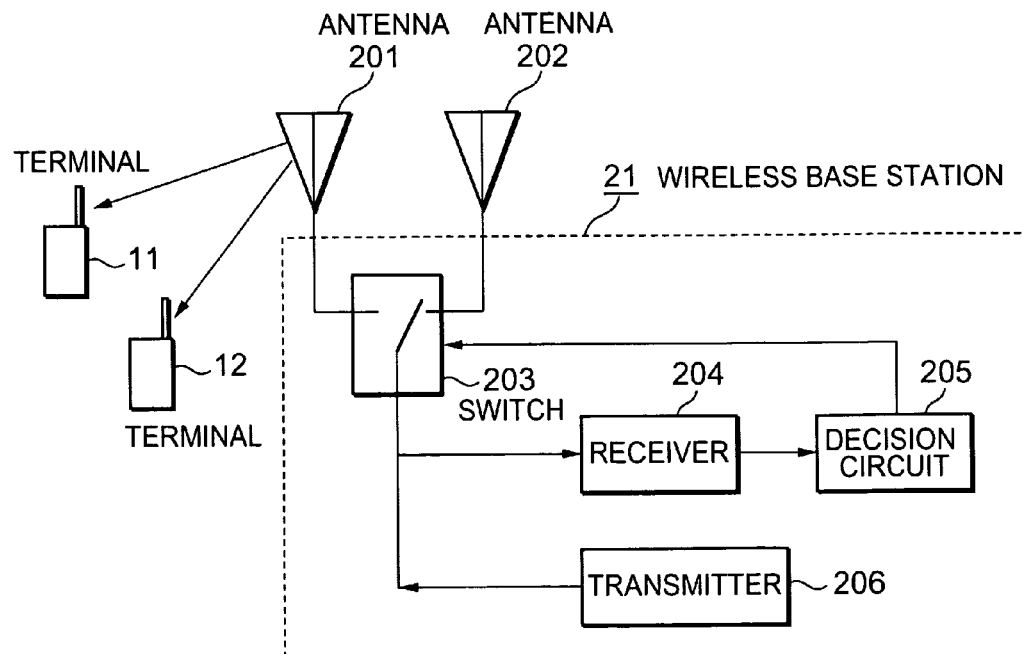
FIG. 7 illustrates a communication system according to a eighth embodiment of the present invention.

FIG. 7 shows a communication system according to a seventh embodiment of the present invention. The wireless base station 21 according to the seventh embodiment is substantially similar to wireless base station 20 of the sixth embodiment, but further comprises a transmitter 206 sixth. The transmitter 206 transmits a transmission signal to the terminals 11 and/or 12 by means of the antenna 201 or 202. The switch 203 is coupled to both the receiver 204 and the transmitter 206. In the eighth embodiment, an antenna for transmission of the wireless base station 21 is selected according to which antenna is used for reception. In other words, the antenna selected by the switch 203 for receiving wireless signals is also used to transmit the transmission signal from the transmitter 206.

Figure 8:
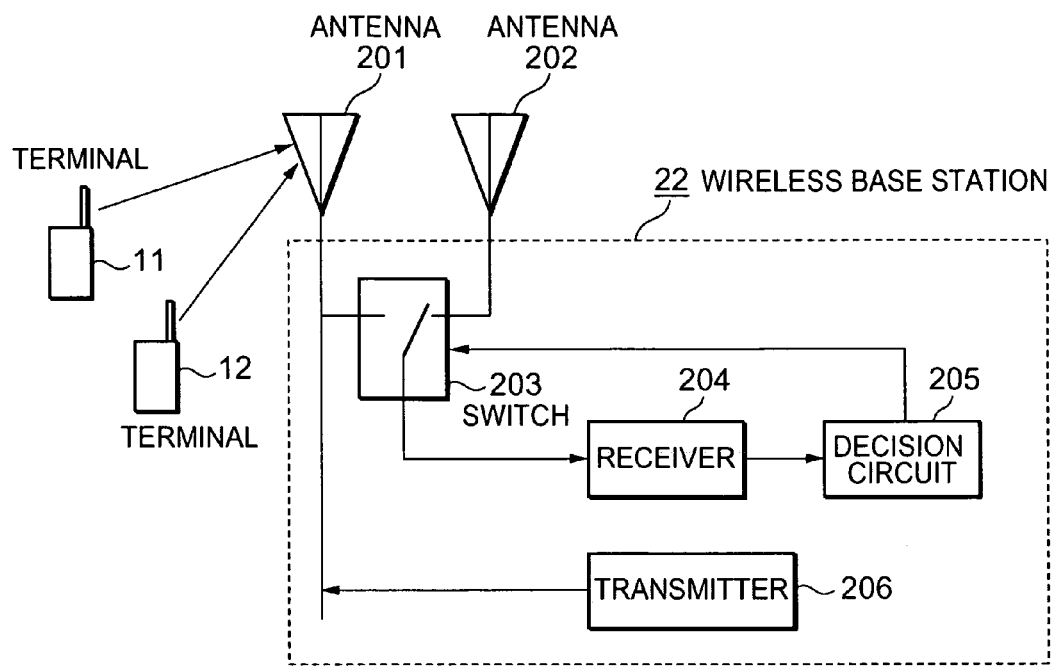
FIG. 8 illustrates a communication system according to a eighth embodiment of the present invention.

FIG. 8 shows a communication system according to a eighth embodiment of the present invention. The wireless base station 22 according to the eighth embodiment is substantially similar to the wireless base station 20 described with respect to the sixth embodiment, but further comprises a transmitter 206. The transmitter 206 is coupled to the first antenna 201 but is not coupled to the second antenna 202. The method of selection of an antenna for reception is identical to that described above with respect to the sixth embodiment.

Figure 9:
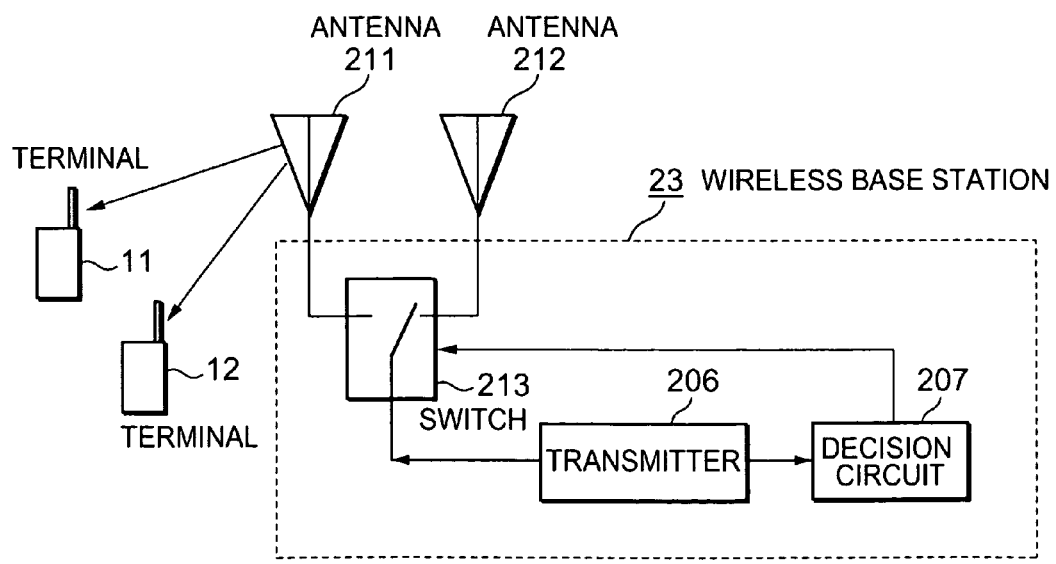
FIG. 9 illustrates a communication system according to a ninth embodiment of the present invention.

FIG. 9 shows a communication system according to a ninth embodiment of the present invention. The communication system according to the ninth embodiment comprises terminals 11 and 12, and a wireless base station 23.

The wireless base station 23 comprises a first transmission antenna 211, a second transmission antenna 212, a switch 213, a transmitter 206, and a decision circuit 207. The transmitter 206 outputs transmission signals to the switch 213. In addition, the transmitter 206 sends information (e.g. a transmission power value) to the decision circuit 207. The decision circuit 207 receives the information from the transmitter 206 and outputs a switch control signal to the switch 213. The switch 213 receives the transmission signals from the transmitter 206 and the switch control signal from the decision circuit 207 and selects and switches the coupling between the first transmission antenna 211 and the second transmission antenna 212, and the transmitter 206 based on the switch control signal. Then, the switch 213 outputs the transmission signals from the transmitter 206 to one of the first transmission antenna and the second transmission antenna following the coupling selected. The antennas 211 and 212 receive the transmission signals from the switch 213 and then transmit the transmission signals to the terminals 11 and/or 12.

The antennas 211 and 212, the switch 213, and transmitter 206 are examples of the plural antennas, the combiner or the combiner/divider, and the transmitter, respectively, in the third to fifth embodiments. The decision circuit 207 is an example of a circuit embedded in the combiner or the combiner/divider in the third to fifth embodiments.

Comparing the transmission power report value from the wireless base station 23 to the user terminals 11, 12 before and after switching the antennas 211 and 212, the switch 213 selects one of the transmission antennas 211 and 212 to be coupled to the transmitter 206 following at least one of the rules (D1) to (D4) described below.

(D1) The switch 213 selects an antenna with the aim of minimizing a maximum transmission power report value from the wireless base station 23 to the user terminals 11 and 12.

(D2) The switch 213 selects an antenna to be coupled to the transmitter 206 with the aim of minimizing a difference between a maximum transmission power report value and a minimum transmission power report value from the wireless base station 23 to the user terminals 11 and 12.

(D3) The switch 213 selects an antenna with the aim of minimizing the average transmission power report value from the wireless base station 23 to the user terminals 11 and 12.

(D4) The switch 213 selects an antenna to be coupled to the transmitter 206 with the aim of minimizing the number of user terminals to which a transmission power report value exceeding a predetermined threshold is sent from the wireless base station 23.

To compare the transmission power report value from the wireless base station 23 before and after switching the antennas 211 and 212, an operation for switching the coupling is required. According to this embodiment, the timing by which the switch 213 switches the coupling is determined by following the rules of (E1) or (E2) described bellow.

(E1) The switch 213 switches the coupling at predetermined intervals.

(E2) The switch 213 switches the coupling when one of the events (F1) to (F4) occurs.

(F1) At least one of the transmission power report values exceeds a predetermined threshold.

(F2) A difference between the maximum value and minimum value of the transmission power report values exceeds a predetermined threshold.

(F3) An average of the transmission power report values exceeds a predetermined threshold.

(F4) A ratio of the number of user terminals, for which the transmission power report values exceeding a predetermined value are sent to, to the total number of the user terminals is more than a predetermined ratio.

The antenna for reception may be switched in conjunction with the antenna for transmission. The configuration of a wireless base station in this case is substantially similar to the configuration described with respect to the eighth embodiment, but wherein the positions of the receiver 204 and of the transmitter 206 are interchanged. In addition, the antenna for reception also may always be the same antenna without switching. In this case, the configuration of a wireless base station is substantially similar to the configuration described with respect to the eighth embodiment, but wherein the positions of the receiver 204 and of the transmitter 206 are interchanged.

Figure 10:
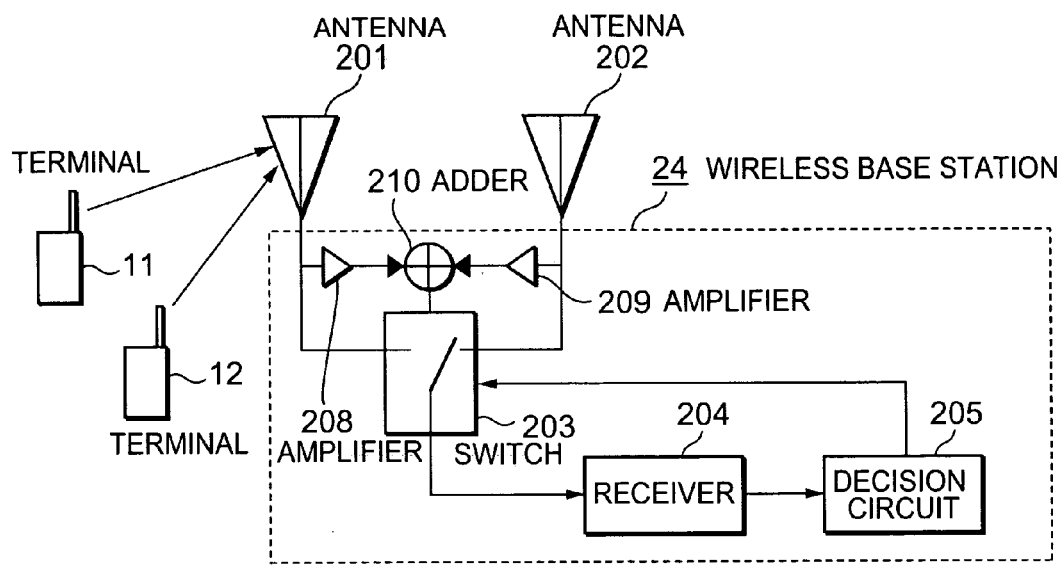
FIG. 10 illustrates a communication system according to a tenth embodiment of the present invention

FIG. 10 shows a communication system according to an tenth embodiment of the present invention. The communication system according to the tenth embodiment comprises a wireless base station 24 and terminals 11 and 12. The wireless base station 24 is an example of the wireless communication apparatus in the first, second, fourth, and fifth embodiments.

The wireless base station according 22 comprises a first antenna 201, a second antenna 202, a switch 203, a receiver 204, a decision circuit 205, amplifiers 208 and 209, and an adder 210. The first and second antennas 201 and 202 receive wireless signals from the terminals 11 and/or 12. The amplifiers 208 and 209 receive signals from antennas 201 and 202 respectively, amplify the signals by predetermined gains, and output the amplified signals to the adder 210. The adder 210 receives the amplified signals from the amplifiers 208 and 209 and adds up the signals from the amplifiers 208 and 209. In other words, the adder 210, and the amplifiers 208 and 209 receive the signals from the antennas 201 and 202, weight the signals and add up the weighted signals. Furthermore, the adder 210 outputs the added signals to the switch 203. The switch 203 receives the signals directly from the antennas 201 and 202, and also receives the added signal from the adder 210 and a switch control signal from the decision circuit 205. Then the switch 203 selects one of the signals from the antennas 201 and 202, and the signal from the adder 210, and sends the selected signal to the receiver 204. Specifically, the switch 203 switches a coupling between the first antenna 201, the second antenna 202, and the adder 210, and the receiver 204 based on the switch control signal. The receiver 204 receives the selected signal from the switch 203. Specifically, the receiver 204 receives the signal from the antenna 201, the signal from the antenna 202, or the signal from the adder 210. Then, the receiver 204 amplifies and demodulates the received signal. In addition the receiver outputs information (e.g. a transmission power value) to the decision circuit 205. The decision circuit 205 receives the information from the receiver 204 and outputs the switch control signal to the switch 203.

The antennas 201 and 202, the switch 203, and the receiver 204 are examples of the plural antennas, the combiner or the combiner/divider, and the receiver, respectively, in the first and second embodiments. The amplifier 208 and 209, the adder 210, and the decision circuit 205 are examples of circuits embedded in the combiner or the combiner/divider in the first, second, fourth, and fifth embodiments.

Comparing transmission power report values reported from the plurality of user terminals 11, 12 before and after switching the coupling between the first antenna 201, the second antenna 202, and the adder 210, and the receiver 204, the switch 203 selects one of the first antenna 201, the second antenna 202, and the adder 210 to be coupled to the receiver 204 following at least one of the rules (G1) to (G4) described below.

(G1) The switch 203 selects one of the antennas 201 and 202, and adder 210 to be coupling to the receiver 204 with the aim of minimizing the maximum transmission power report values reported from the user terminals 11 and 12.

(G2) The switch 203 selects one of the antennas 201 and 202, and adder 210 to be coupled to the receiver 204 with the aim of minimizing the difference between a maximum transmission power report value and a minimum transmission power report value reported from the user terminals 11 and 12.

(G3) The switch 203 one of the antennas 201 and 202, and adder 210 to be coupling to the receiver 204 with the aim of minimizing the average of the transmission power report values reported from the user terminals 11 and 12.

(G4) The switch 203 selects one of the antennas 201 and 202, and adder 210 to be coupling to the receiver 204 with the aim of minimizing the number of user terminals for which the transmission power report value exceeds a predetermined threshold.

To compare the transmission power report values reported from the user terminals 11 and 12 before and after switching the coupling, an operation for switching the coupling is required. According to this embodiment, the timing by which the switch 203 switches the coupling is determined by following the rules of (B1) or (B2) described above.

Figure 11:
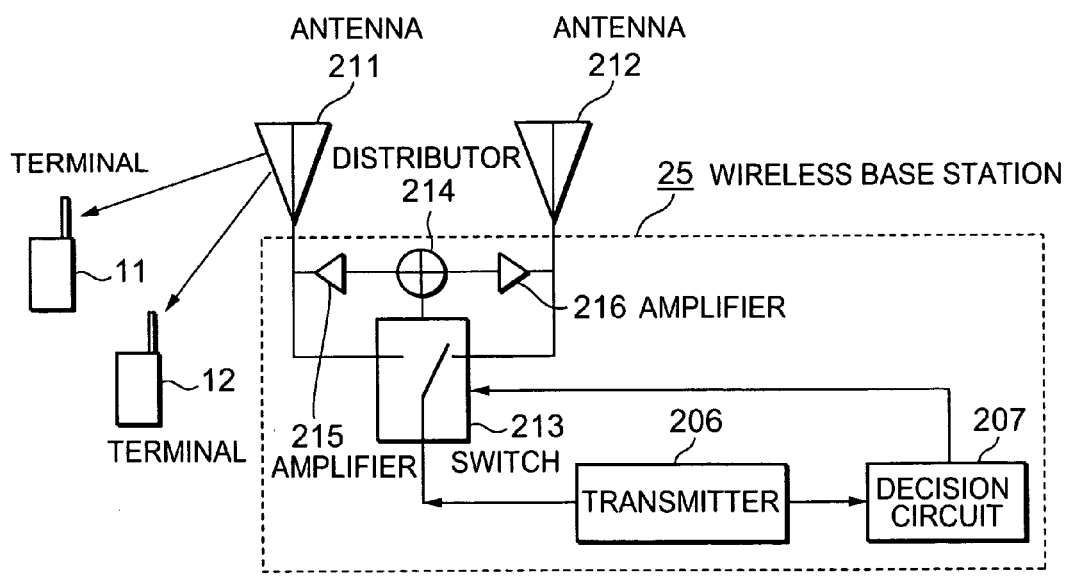
FIG. 11 illustrates a communication system according to a eleventh embodiment of the present invention.

FIG. 11 shows a communication system according to a eleventh embodiment of the present invention. The communication system according to the eleventh embodiment comprises a wireless base station 25, and terminals 11 and 12. The wireless base station 25 is an example of the wireless communication apparatus in the third to fifth embodiments.

The wireless base station 25 comprises a first transmission antenna 211, a second transmission antenna 212, a switch 213, a transmitter 206, a decision circuit 207, amplifiers 215 and 216, and an distributor 214. The transmitter 206 outputs transmission signals to the switch 213 and sends information (e.g. a transmission power value) to the decision circuit 207. The decision circuit 207 receives the information from the transmitter 206 and outputs a switch control signal to the switch 213. The switch 213 receives the transmission signal from the transmitter 206 and the switch control signal from the decision circuit 207. In addition, the switch 213 selects and switches a coupling between the first transmission antenna 211, the second transmission antenna 212, and the distributor 214, and the transmitter 206 based on the switch control signal. Then, the switch 213 outputs the transmission signal from the transmitter 206 to one of the first transmission antenna, the second transmission antenna, and the distributor 214 following the coupling selected. If the distributor 214 receives the transmission signal from the switch 213, it distributes the transmission signal to the amplifiers 215 and 216 which amplify the transmission signal by predetermined gains. In other words, the distributor 214 and the amplifiers 215 and 216 divide the transmission signal into two signals and weight the two signals. Then, the amplifiers 215 and 216 output the weighted signals to the antennas 211 and 212 respectively. The antennas 211 and 212 receive the transmission signal directly from the switch 213 or receive the weighted signal from the amplifies 215 and 216 respectively. Then the antennas transmit the transmission signal or the weighted signals to the terminals 11 and/or 12.

The antennas 211 and 212, the switch 213, and the transmitter 206 are examples of the plural antennas, the divider or the combiner/divider, and the transmitter, respectively, in the third to fifth embodiments. The amplifiers 215 and 216, the distributor 214, and the decision circuit 207 are examples of circuits embedded in the divider or the combiner/divider in the third to fifth embodiments.

Comparing the transmission power report value from the wireless base station 25 to the user terminals 11, 12 before and after switching the coupling between the transmission antennas 211, 212, and the distributor 214, and the transmitter 206, the switch 213 selects one of the transmission antennas 211 and 212 and the distributor 214 to be coupled to the transmitter 206 following at least one of the rules (H1) to (H4) described below.

(H1) The switch 213 selects one of the transmission antennas 211 and 212 and the distributor 214 with the aim of minimizing the maximum transmission power report value from the wireless base station 25 to the user terminals 11 and 12.

(H2) The switch 213 selects one of the transmission antennas 211 and 212 and the distributor 214 with the aim of minimizing a difference between the maximum transmission power report value and the minimum transmission power report value from the wireless base station 25 to the user terminals 11 and 12.

(H3) The switch 213 selects one of the transmission antennas 211 and 212 and the distributor 214 with the aim of minimizing the average transmission power report value from the wireless base station 25 to the user terminals 11 and 12.

(H4) The switch 213 selects one of the transmission antennas 211 and 212 and the distributor 214 with the aim of minimizing the number of user terminals to which a transmission power report value exceeding a predetermined threshold is sent from the wireless base station 25.

To compare the transmission power report value from the wireless base station 25 to the user terminals 11 and 12 before and after switching the coupling between the transmission antennas 211 and 212, and the distributor 214, and the transmitter 206, an operation for switching the coupling is required. According to this embodiment, the timing by which the switch 213 switches the coupling is determined by following the rules of (E1) or (E2) described above.

Figure 12:
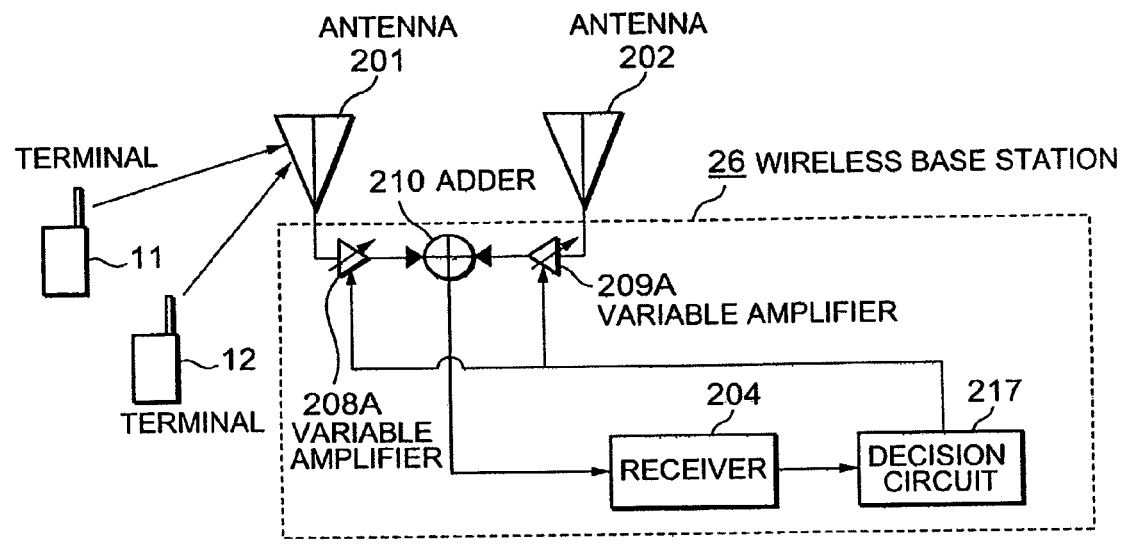
FIG. 12 illustrates a communication system according to a twelfth embodiment of the present invention.

FIG. 12 shows a communication system according to a twelfth embodiment of the present invention. The communication system according to the twelfth embodiment comprises a wireless base station 26, and the terminals 11 and 12. The wireless base station 26 is an example of the Wireless communication apparatus in the first, second, fourth, and fifth embodiments.

The wireless base station 26 comprises a first antenna 201, a second antenna 202, a receiver 204, a decision circuit 217, variable amplifiers 208A and 209A, and an adder 210. The first and second antennas 201 and 202 receive wireless signals from the terminals 11 and/or 12. The variable amplifiers 208A and 209A receive signals from antennas 201 and 202 respectively and receive gain control signals from the decision circuit 217. The amplifiers 208A and 209A amplify the signals received from the antennas by variable gains based on the gain control signals and then output the amplified signals to the adder 210. The adder 210 receives the amplified and adds them. In other words, the adder 210 and amplifiers 208A and 209A receive the signals from the antennas 201 and 202, weight them by variable weights, and add up the weighted signals based on the control signal from the decision circuit 217. Furthermore, the adder 210 outputs the added signals to the receiver 204. The receiver 204 receives the added signal from the adder 210 and amplifies and demodulates tit. In addition the receiver outputs information (e.g. transmission power value) to the decision circuit 217. The decision circuit 217 receives the information from the receiver 204 and outputs the gain control signal to the amplifier 208A and 209A.

The antennas 201 and 202, and the receiver 204 are examples of the plural antennas, and the receiver, respectively, in the first, second, fourth, and fifth embodiments. The amplifiers 208A and 209A, the adder 210, and the decision circuit 207 are examples of circuits embedded in the combiner/divider in the first, second, fourth, and fifth embodiments.

Comparing transmission power report values reported from the plurality of user terminals 11, 12 before and after varying the variable gains of variable amplifier 208A and 209A, the decision circuit 217 controls the variable gains following at least one of the rules (J1) to (J4) described below.

(J1) The decision circuit 217 controls the variable gains with the aim of minimizing a maximum value of the transmission power report values reported from the user terminals 11 and 12.

(J2) The decision circuit 217 controls the variable gains with the aim of minimizing a difference between the maximum transmission power report value and the minimum transmission power report value reported from the user terminals 11 and 12.

(J3) The decision circuit 217 controls the variable gains with the aim of minimizing the average transmission power report value reported from the user terminals 11 and 12.

(J4) The decision circuit 217 controls the variable gains with the aim of minimizing the number of user terminals for which transmission power report values exceed a predetermined threshold.

According to this embodiment, the timing by which the decision circuit 217 controls the variable gains is determined by following the rules of (K1) or (K2) described bellow.

(K1) The decision circuit 217 controls the variable gains at predetermined intervals.

(K2) The decision circuit 217 controls the variable gains when one of the events (L1) to (L4) occurs.

(L1) At least one of the transmission power report values exceeds a predetermined threshold.

(L2) A difference between the maximum transmission power report value and the minimum transmission power report value exceeds a predetermined threshold.

(L3) An average of the transmission power report values exceeds a predetermined threshold.

(L4) A ratio of the number of user terminals, for which the transmission power report values exceed a predetermined value, to the total number of the user terminals is more than a predetermined ratio.

Figure 13:
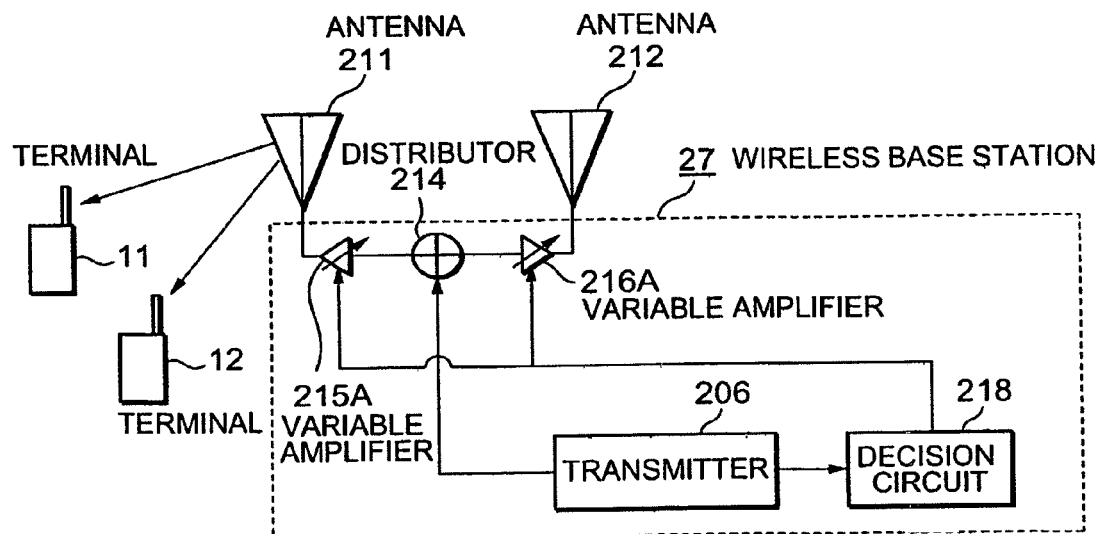
FIG. 13 illustrates a communication system according to a thirteenth embodiment of the present invention.
Figure 14:
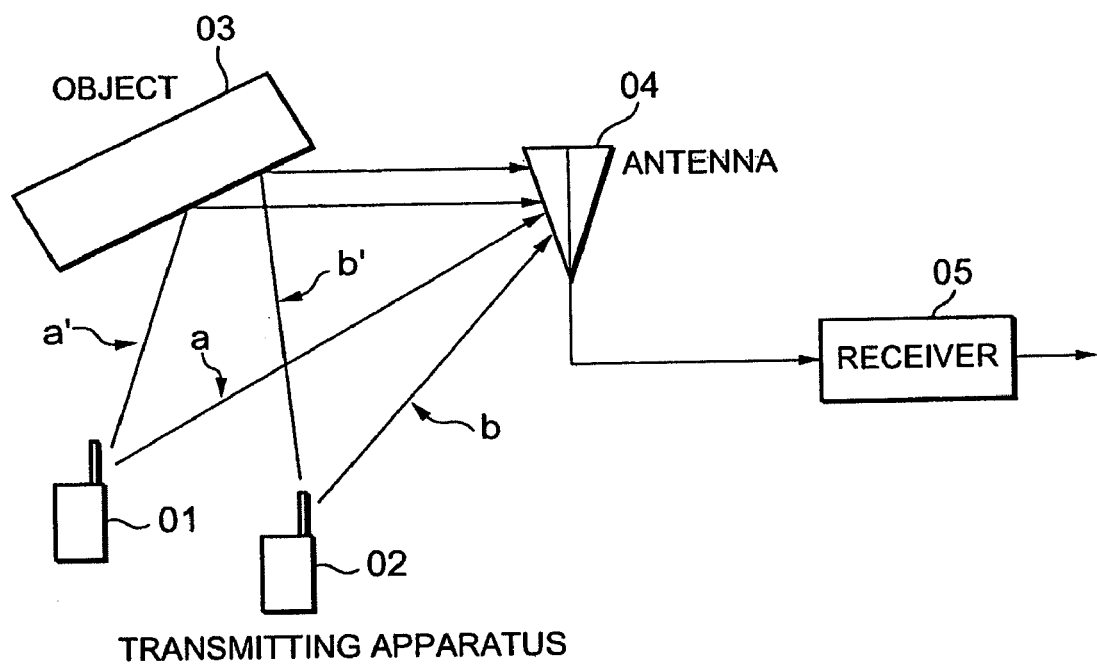
FIG. 14 illustrates a conventional communication system.

FIG. 13 shows a communication system according to a thirteenth embodiment of the present invention. The communication system according to the thirteenth embodiment comprises a wireless base station 27 and terminals 11 and 12. The wireless base station 27 is an example of the wireless communication apparatus in the third to fifth embodiments.

The wireless base station 27 comprises a first transmission antenna 211, a second transmission antenna 212, a transmitter 206, a decision circuit 218; variable amplifiers 215A and 216A, and an distributor 214. The transmitter 206 outputs transmission signals to the distributor 214 and sends information (e.g. a transmission power value) to the decision circuit 218. The decision circuit 218 receives the information from the transmitter 206 and outputs gain control signals to the variable amplifiers 215A and 216A. The distributor 214 receives the transmission signals from the transmitter 206 and distributes the transmission signals to the variable amplifiers 215A and 216A. The variable amplifiers 215A and 216A amplify the distributed signals from the distributor 214 by variable gains based on the gain control signals from the decision circuit 218. In other words, the distributor 214 and the variable amplifiers 215A and 216A divide the transmission signals into two signals and weight them by variable weights based on the gain control signals. Then, the variable amplifiers 215A and 216A output the two weighted signals to the antennas 211 and 212, respectively. The antennas 211 and 212 receive the weighted signals from the amplifies 215 and 216 respectively and transmit the weighted signals to the terminals 11 and/or 12.

The antennas 211 and 212, and transmitter 206 are examples of the plurality of antennas, and the transmitter, respectively, in the third to fifth embodiments. The variable amplifiers 215A and 216A, the distributor 214, and the decision circuit 218 are examples of circuits embedded in the combiner/divider in the third to fifth embodiments.

Comparing the transmission power report values from the wireless base station 27 to the user terminals 11, 12 before and after varying the variable gains of variable amplifier 215A and 216A, the decision circuit 218 controls the variable gains following at least one of the rules (M1) to (M4) described below.

(M1) The decision circuit 218 controls the variable gains with the aim of minimizing the maximum transmission power report value from the wireless base station 27 to the user terminals 11 and 12.

(M2) The decision circuit 218 controls the variable gains with the aim of minimizing a difference between the maximum transmission power report value and the minimum transmission power report value from the wireless base station 27 to the user terminals 11 and 12.

(M3) The decision circuit 218 controls the variable gains with the aim of minimizing the average transmission power report value reported from the wireless base station 27 to the user terminals 11 and 12.

(M4) The decision circuit 218 controls the variable gains with the aim of minimizing the number of user terminals to which a transmission power report value exceeding a predetermined threshold is sent from the wireless base station 27.

According to this embodiment, the timing by which the decision circuit 218 controls the variable gains is determined by following the rules of (N1) or (N2) described below.

(N1) The decision circuit 218 controls the variable gains at predetermined intervals.

(N2) The decision circuit 218 controls the variable gains when one of the events (O1) to (O4) occurs.

(O1) At least one of the transmission power report values exceeds a predetermined threshold.

(O2) A difference between the maximum value and minimum value of the transmission power report values exceeds a predetermined a predetermined threshold.

(O3) An average of the transmission power report values exceeds a predetermined threshold.

(O4) A ratio of the number of user terminals, to which the transmission power report values exceeding a predetermined number is sent to, to the total number of the user terminals is more than a predetermined value.

It is thereby possible to prevent communication of the transmission and reception signals from being interrupted by gradually varying the gains or weights and to improve the communication characteristics by selecting optimum gains and weights.

The sixth to thirteenth embodiments are described based on two antennas. It is also possible, however, to apply three or more antennas to the embodiments as would be understood by one of skill in the art. In this case, the antenna selection may be accomplished by means of a trial and error process or by another means as would be understood by one of skill in the art.

In the embodiments described above, if a communication drastically deteriorates (such as drastic deterioration of receiving characteristics) after switching the couplings or after varying the gains, or the weights, the coupling, the gains or weights may be restored to a state before switching or varying.

In the embodiments described above, an antenna for transmission and an antenna for reception, or the gains of amplifiers for transmission and reception may be selected or controlled separately by means of the above methods. In this case, a wireless base station has both of the configurations in FIG. 6 and FIG. 9, or the configurations in FIGS. 10 and 12.

Parameters such as the transmission power to the user terminals from the base station may be stored or saved before switching the couplings, or before varying the gains or weights. In addition the parameters stored or saved may be used again to control the transmission of reception or transmission when the coupling, the gains, or the weights are restored to a state before the switching or the varying.

The coupling, the gains, or the weights may be switched or varied at a time when there is no heavy communication traffic to prevent the communication from being interrupted and to prevent data from being lost.

When comparing transmission power report values, each of the transmission power values may be weighted based on the transmission rate of the transmission.

The predetermined values for determining which coupling, gain, or weight is to be selected, or for determining whether the coupling, gain, or weight is to be switched, such as the predetermined values in the rules A1 to F4, may be determined or changed based on a condition of a communication, such as a propagation condition of wireless signals, the number of the user terminals, and so on, as would be understood by one of skill in the art.

A terminal which performs DHO (Diversity Hand Over) procedure with another base station may be excluded from the transmission power report value comparison.

While the present invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the following claims.

What is claimed:

1. A wireless communication apparatus comprising:
a plurality of antennas which receive plurality of wireless reception signals from at least one of a plurality of secondary communication apparatuses;
a combiner which is coupled to said plurality of antennas, said combiner receiving a plurality of internal reception signals from said plurality of antennas respectively and combining the plurality of internal reception signals to form a combined signal; and
a receiver which is coupled to said combiner, said receiver receiving the combined signal;
wherein said combiner weights the plurality of internal reception signals with variable weights and controls the variable weights at regular intervals,
wherein said combiner controls the variable weights based on transmission powers of the plurality of wireless reception signals transmitted from at least one of the plurality of secondary communication apparatuses, and
wherein the transmission powers of the plurality of wireless reception signals are controlled by a closed loop power control between said wireless communication apparatus and at least one of the plurality of secondary communication apparatuses.

2. A wireless communication apparatus according to claim 1, wherein
said combiner controls the variable weights with the aim of reducing one of:
a maximum transmission power of the plurality of wireless reception signals;
an average transmission power of the plurality of wireless reception signals;
a fluctuation of the average transmission power of the plurality of wireless reception signals;
a difference between the maximum transmission power and a minimum transmission power of the plurality of wireless reception signals; and
the number of the wireless reception signal for which transmission power is higher than a predetermined transmission power.

3. A wireless communication apparatus comprising:
a plurality of antennas which receive plurality of wireless reception signals from at least one of a plurality of secondary communication apparatuses;
a combiner which is coupled to said plurality of antennas, said combiner receiving a plurality of internal reception signals from said plurality of antennas respectively and combining the plurality of internal reception signals to form a combined signal; and
a receiver which is coupled to said combiner, said receiver receiving the combined signal, wherein
said combiner controls variable weights based on transmission power report values of the plurality of wireless reception signals reported from at least one of the plurality of secondary communication apparatuses, and
transmission powers of the plurality of wireless reception signals are controlled by a closed loop power control between said wireless communication apparatus and at least one of the plurality of secondary communication apparatuses.

4. A wireless communication system comprising:
a wireless communication apparatus; and
a plurality of secondary communication apparatuses, wherein said wireless communication apparatus comprises:
a plurality of antennas which receive a plurality of wireless reception signals from at least one of said plurality of secondary communication apparatuses;
a combiner which is coupled to said plurality of antennas, said combiner receiving a plurality of internal reception signals from said plurality of antennas respectively and combining the plurality of internal reception signals to form a combined signal; and
a receiver which is coupled to said combiner, said receiver receiving the combined signal; and
each of said plurality of secondary communication apparatuses comprises:
an antenna which transmits at least one of the plurality of wireless reception signals to said wireless communication apparatus, wherein
said combiner controls variable weights based on transmission power report values of the plurality of wireless reception signals reported from at least one of the plurality of secondary communication apparatuses, and
transmission powers of the plurality of wireless reception signals are controlled by a closed loop power control between said wireless communication apparatus and at least one of the plurality of secondary communication apparatuses.

5. A wireless communication apparatus comprising:
a plurality of antenna means for receiving a plurality of wireless reception signals from at least one of a plurality of secondary communication apparatuses;
a combining means for receiving a plurality of internal reception signals from said plurality of antenna means respectively and for combining the plurality of internal reception signals to form a combined signal; and
a receiving means for receiving the combined signal from said combining means, wherein
said combining means controls variable weights based on transmission power report values of the plurality of wireless reception signals reported from at least one of the plurality of secondary communication apparatuses, and
transmission powers of the plurality of wireless reception signals are controlled by a closed loop power control between said wireless communication apparatus and at least one of the plurality of secondary communication apparatuses.

6. A wireless communication system comprising:
a wireless communication apparatus; and
a plurality of secondary communication apparatuses, wherein said wireless communication apparatus comprises:
a plurality of antenna means for receiving a plurality of wireless reception signals from at least one of said plurality of secondary communication apparatuses;
a combining means for receiving a plurality of internal reception signals from said plurality of antenna means respectively and for combining the plurality of internal reception signals to form a combined signal; and
a receiving means for receiving the combined signal from said combing means; and
each of said plurality of secondary communication apparatuses comprises:
an antenna means for transmitting at least one of the plurality of wireless reception signals to said wireless communication apparatus; wherein
said combiner controls variable weights based on transmission power report values of the plurality of wireless reception signals reported from at least one of the plurality of secondary communication apparatuses, and
transmission powers of the plurality of wireless reception signals are controlled by a closed loop power control between said wireless communication apparatus and at least one of the plurality of secondary communication apparatuses.

* * * * *